Sept. 6, 1927.
R. B. MacMULLIN ET AL
1,641,544
MANUFACTURE OF ALCOHOLS
Filed Aug. 27, 1924
2 Sheets-Sheet 1
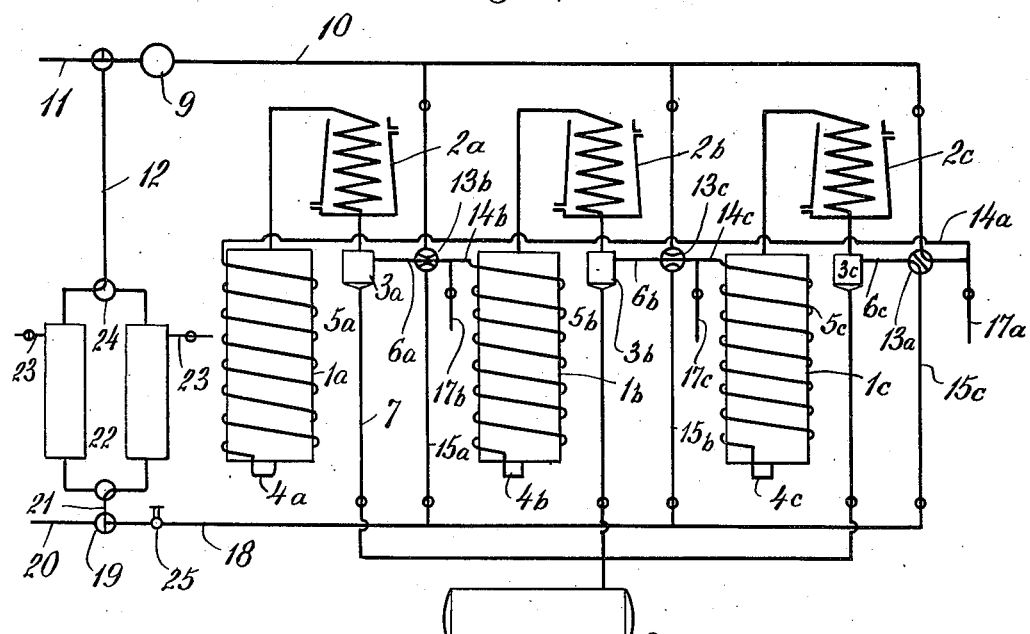
Fig. 1,
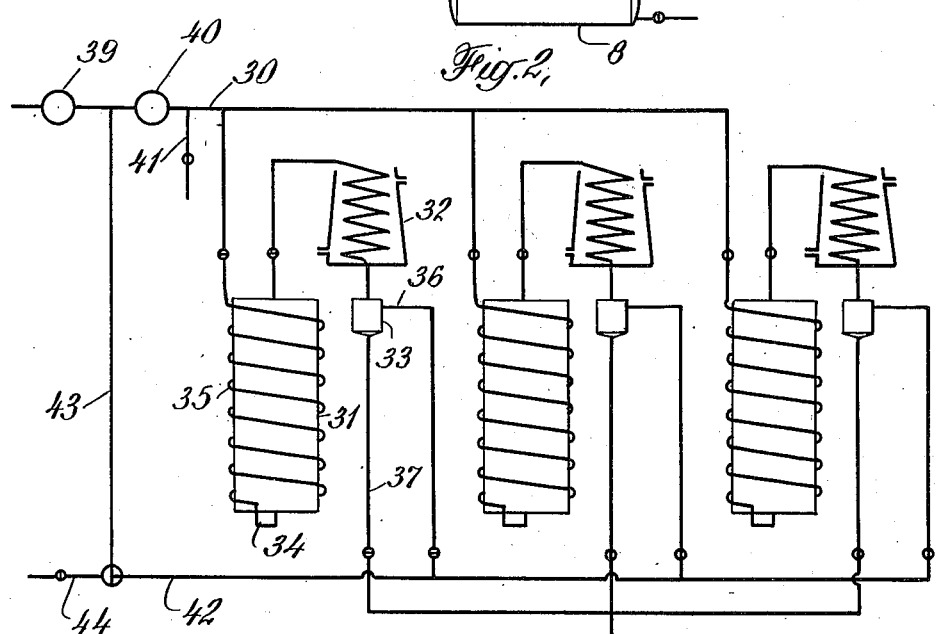
Fig. 2,
INVENTORS
Robert B. MacMullin
Ralph E. Gegenheimer
BY
ATTORNEYS

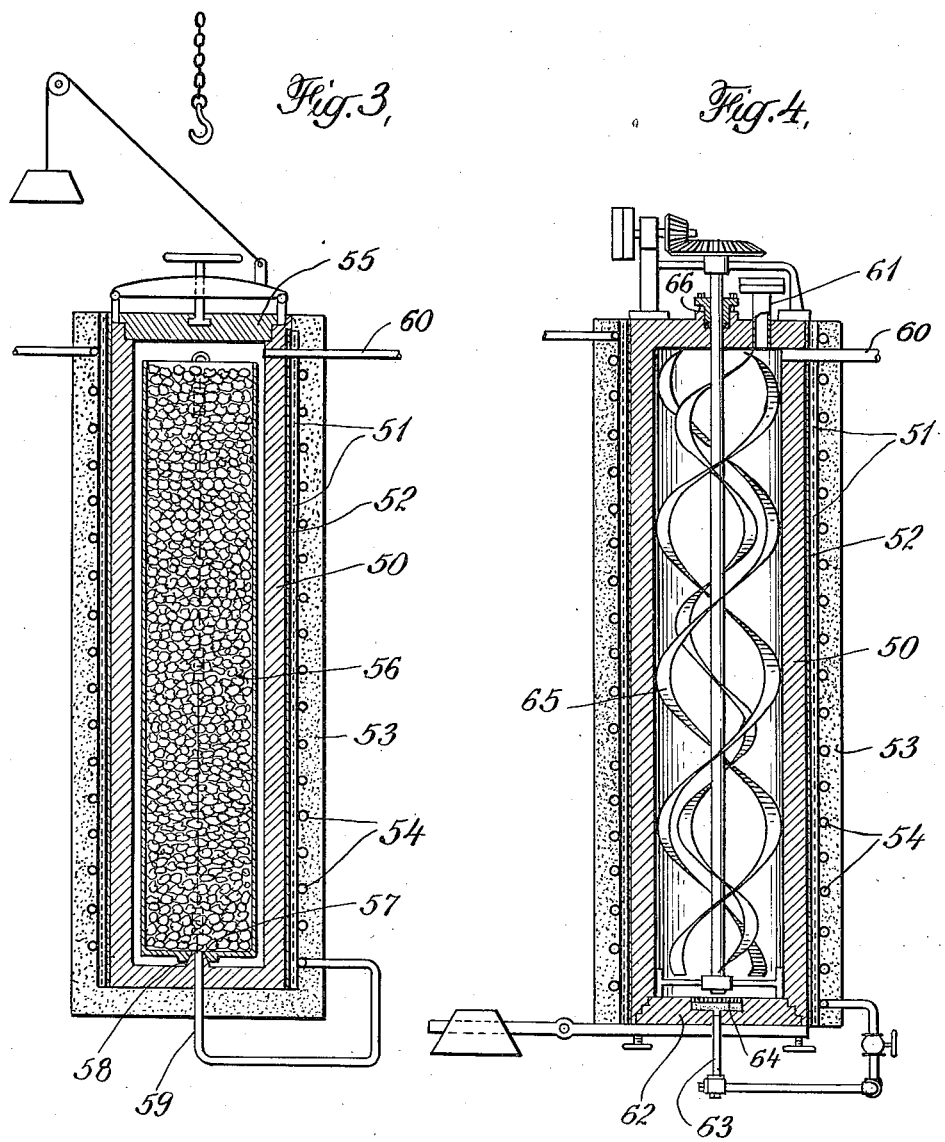

Patented Sept. 6, 1927.

1,641,544

UNITED STATES PATENT OFFICE.

ROBERT B. MacMULLIN AND RALPH E. GEGENHEIMER, OF NIAGARA FALLS, NEW YORK, ASSIGNORS TO THE MATHIESON ALKALI WORKS, INC., OF NEW YORK, N. Y. A CORPORATION OF VIRGINIA.

MANUFACTURE OF ALCOHOLS.

Application filed August 27, 1924. Serial No. 734,394.

This invention relates to improvements in the manufacture of alcohols from alkyl chlorides, and more particularly to the manufacture of methyl alcohol or methanol from methyl chloride.

In our prior application filed August 25, 1921, Serial No. 495,357, we have described a method of converting methyl chloride to methyl alcohol by passing the methyl chloride into contact with lime in the presence of superheated steam. The present invention relates particularly to improvements in the method and in apparatus for carrying out the method described in this prior application.

This invention includes improvements in the process and in the method of operation, and improvements in the arrangement and construction of apparatus for carrying out such processes.

As we have pointed out in the prior application referred to above, radically increased yields of methyl alcohol can be produced from methyl chloride by passing it into contact with hydrated lime in the presence of highly superheated steam with control of the conditions of the reactions, such as the temperature, pressure, time of contact, and amount of superheated steam. Our investigations have indicated that the rate of reaction and the output of the apparatus as well as the yields of methyl alcohol can be greatly increased and objectionable decomposition of the methyl alcohol inhibited by carrying out the reaction at a superatmospheric pressure, for example at a pressure up to 175 or 200 pounds per square inch or higher, and at a temperature between about 350° C. and 450° C. We have also found it advantageous to prolong the period of contact between the mixture of steam and methyl chloride and the lime, for example to as much as 40 seconds or more; and to employ a mixture including steam and methyl chloride in approximately equimolal proportions. While we have found that these various features can be combined to particular advantage, it will be understood that certain advantages of the process can be obtained if only part of these conditions are used.

We have further found that methyl alcohol or methanol can be produced from methyl chloride in a continuous or semi-continuous manner with high efficiency and high yields by effecting the reaction between the methyl chloride and admixed steam in a plurality of reaction chambers which are consecutively recharged with hydrated lime with effective control of the periods of reaction and of the intervals between the introduction of successive charges.

In one way of carrying out the process of the invention, methyl chloride and admixed steam are passed through each of a plurality of conversion chambers which are recharged with fresh hydrated lime consecutively at approximately equal intervals so that the consumption of lime in each chamber is at a different and progressive stage and so that the overall conversion of methyl chloride and production of methyl alcohol is maintained aproximately uniform. By maintaining a high rate of flow of the admixed methyl chloride and steam, a high rate of production of methyl alcohol can be obtained.

Where the reaction products escaping from the reaction chamber include substantial amounts of methyl chloride, the methyl chloride may be recirculated through the chamber after condensing out the methyl alcohol. The recirculated methyl chloride carries with it a small amount of methyl alcohol which will not condense, and, if the excess methyl chloride is continuously recirculated, the non-condensable methyl alcohol will gradually decompose due to its prolonged time of contact with the lime and admixed calcium chloride formed by the reaction. Before recirculation, the methyl chloride may advantageously be subjected to an absorption treatment for recovering the methyl chloride in higher concentration and for separating any gaseous decomposition products such as hydrogen. The treatment of the methyl chloride to separate from it such admixed constituents may be carried out continuously, or the recirculated gas may be subjected to treatment from time to time as such constituents accumulate.

In another way of carrying out the process of the invention, the methyl chloride with admixed steam is passed successively through a series of conversion chambers containing progressively fresher hydrated lime, and as the lime in each chamber is consumed the chamber is recharged with fresh lime and connected in at the other end of the series so that the methyl chloride is in effect contacted with the lime in countercurrent. A nearly complete conversion of the methyl chloride and consumption of the lime can thus be effected. The gaseous mixture escaping from each chamber can be subjected to condensation for the separation of methyl alcohol and the unconverted methyl chloride admixed with fresh steam introduced into the next chamber. The methyl chloride can thus be subjected to prolonged contact with the lime in the presence of steam while the methyl alcohol is progressively removed as it is formed and at the same time the proportions of steam and methyl chloride throughout the process can be closely regulated. The progressive removal of the methyl alcohol reduces the time during which it is in contact with the lime and calcium chloride in the reaction chamber, in contact with which it slowly decomposes, and it also increases the concentration of methyl chloride and steam in the gas mixture entering each reaction chamber. The removal of the methyl alcohol as it is formed also reduces the total volume of the gas mixture and hence prolongs the period of contact in the successive reaction chambers thereby further promoting complete conversion of the methyl chloride.

The non-condensable gases escaping from the last reaction chamber include principally hydrogen and a small amount of unconverted methyl chloride. The methyl chloride may be recovered by an absorption treatment. The methyl chloride, for example, may be absorbed in methyl alcohol, in which it is very soluble but in which the inert gases are comparatively insoluble, and the methyl chloride subsequently distilled from the methyl alcohol.

The invention will be further described in connection with the accompanying drawings which illustrate in a diagrammatic way apparatus embodying the invention and adapted for carrying out the process of the invention. In the drawings:

Fig. 1 schematically represents one arrangement of apparatus for carrying out the conversion, Fig. 2 represents in a similar way another arrangement of apparatus for carrying out the conversion, Fig. 3 is a vertical section of a furnace adapted for use in the practice of the invention, and Fig. 4 is a similar view of a somewhat modified furnace structure.

The apparatus illustrated in Fig. 1 is arranged for subjecting methyl chloride in admixture with steam to contact with lime at an elevated temperature in a series of reaction furnaces through which the gas mixture is successively passed. Each of the furnaces 1 in the series, shown as three in number, are connected to a water cooled condenser 2 which is arranged to discharge into a separator 3. A connection 4 is provided to introduce admixed methyl chloride and steam into each furnace from a preheater 5. The separators 3 are provided with an outlet 6 for uncondensed gases and a connection 7 to a common storage receptacle 8 for receiving the condensate which includes the methyl alcohol. The pump 9 is arranged to force methyl chloride into the common connection 10 under a pressure somewhat in excess of that prevailing in the reaction furnaces. This methyl chloride may be drawn from any suitable source through connection 11 or it may be supplied from recovery apparatus, which will be described later, through connection 12. A valve 13, located between the gas outlet 6 and the gas inlet 14 of successive furnaces is arranged to connect either the gas discharge connection 6 from the separator 3 with the gas outlet connection 15 and the common methyl chloride supply connection 10 with the connection 14, or the gas discharge connection 6 from the separator 3 with the connection 14 while shutting off the common supply connection and the gas outlet connection.

As illustrated in Fig. 1, the valves are shown as set to conduct the methyl chloride successively through furnaces 1$^a$, 1$^b$ and 1$^c$. The methyl chloride enters the first furnace through the valve 13$^a$ and the connections 14$^a$ and 4$^a$. Steam is introduced through connection 17$^a$ and passes in admixture with the methyl chloride through the preheater 5$^a$ to the first reaction furnace 1$^a$ where the mixture is brought in contact with the charge of hydrated lime in the furnace. In the furnace 1$^a$ the methyl chloride is partly converted to methyl alcohol and the methyl alcohol and remaining steam are condensed and collect in the separator 3$^a$. The unconverted methyl chloride is passed to the second reaction furnace 1$^b$ through connection 6$^a$, valve 13$^b$, and connections 14$^b$ and 4$^b$ in admixture with a fresh supply of steam introduced through connection 17$^b$. The methyl chloride is further converted to methyl alcohol in the second reaction furnace and the methyl alcohol and remaining steam are again condensed and collect in the separator 3$^b$, and the remaining methyl chloride, together with fresh steam is passed through the third reaction furnace 1$^c$ where a further quantity of methyl alcohol is produced and collected in a similar way, the uncondensed gases from the last separator 3$^c$ escaping through connection 15$^c$.

In initial operation, the lime in the first furnace is consumed at a greater rate than the lime in the second and third furnaces. For example, when 50% of the lime in the third furnace has been converted into calcium chloride the lime in the first furnace may be nearly completely consumed, being converted to calcium chloride up to an extent of 85% to 90% or more. When the conversion of methyl chloride to methyl alcohol in the first furnace begins to fall off, that is as the lime charge is converted to calcium chloride and losses its activity, the furnace 1ª is discharged and filled with fresh lime, and by adjusting valves 13ª and 13ᵇ it is made the last furnace in the series, the methyl chloride initially entering furnace 1ᵇ and passing successively through furnaces 1ᶜ and 1ª, any uncondensed gases from the furnace 1ª and the separator 3ª escaping through connection 15ª. As the lime in the second furnace 1ᵇ is used up, it is replaced in a similar manner and furnace 1ᵇ is made the last in the series.

At this point in the operation, the methyl chloride is passing through a series of furnaces in which it is successively contacted with progressively fresher charges of lime, and, as the operation is continued and the furnaces are successively recharged and moved up in the series, the methyl chloride is contacted with the lime in what amounts to counter-current flow. The velocity of the gas mixture is lowest in the last furnace in the series which contains the freshest charge of lime, due to the conversion of methyl chloride to methyl alcohol which is removed by condensation between successive furnaces, and very complete conversion of the methyl chloride to methyl alcohol may be effected while at the same time relatively large volumes of methyl chloride can be subjected to treatment. This method of operation also effects a very efficient conversion of the lime.

By condensing out the methyl alcohol between the successive furnaces in the series, decomposition of the methyl alcohol due to further contact with the highly heated lime and admixed calcium chloride is prevented, while at the same time the concentration of methyl chloride and steam in the gas mixture is increased, the gas mixture entering each successive furnace corresponding substantially in composition to the gas mixture entering the first furnace and including in addition only such small quantities of fixed gases as may escape from the preceding furnaces. In this way, the rate of flow of the gas mixture through the last furnace in the series is materially reduced and the time of contact in the last furnace materially prolonged, and the production of methyl alcohol and the complete conversion of the methyl chloride is promoted.

The non-condensable gas escaping from the last furnace in the series consists principally of hydrogen together with a small amount of unconverted methyl chloride. These gases are collected in the common header 18 from the discharge connections 15. By adjusting the two-way valve 19, this gas may be discharged through connection 20 or directed through connection 21 to apparatus for recovering the methyl chloride content. The methyl chloride may be recovered by absorption in a solvent, such as methyl alcohol, by bubbling the gas through a body of the solvent or by scrubbing the gas with the solvent in a wash tower. The methyl chloride can then be recovered by distillation from the solvent. In the drawing two recovery receptacles are shown for alternate operation either of which may be connected to the connection 21 by means of the two-way valve 22. The gas is discharged into one of these receptacles, the waste gas escaping through a connection 23 while the other receptacle is connected to connection 12 by means of the two-way valve 24 for return of absorbed methyl chloride to the process.

The apparatus illustrated in Fig. 1 is arranged so that the entire system including the preheaters, the furnaces, the condensers, and the separators can be maintained at the same internal pressure. Where superatmospheric pressure is employed, it may be regulated by the pressure reducing valve 25 in the common gas discharge line or by other suitable means.

The apparatus illustrated in Fig. 2 is arranged to provide a plurality of reaction furnaces, shown as three in number, which are consecutively recharged with hydrated lime so that the operation can be carried out in a substantially continuous manner. Each reaction furnace 31 is connected to a condenser 32 which discharges into a separator 33. The methyl chloride and admixed steam are introduced into each furnace through the connection 34 and the preheater 35 from the common header 30. A connection 36 is provided for the discharge of uncondensed gases from the receiver 33 and a connection 37 is arranged to conduct the condensate which includes the methyl alcohol from the receiver to a common storage receptacle 38. A pump 39 is arranged to force fresh methyl chloride into the system and pump 40 is provided for circulating methyl chloride within the system. Steam is introduced and admixed with the methyl chloride entering the reaction furnaces through connection 41.

In operation, each of the furnaces is recharged with fresh lime consecutively. We have found it advantageous to introduce the successive fresh charges at approximately equal intervals of time so that the consumption of lime progresses regularly and so that the over-all rate of conversion of methyl chloride to methyl alcohol is substantially uniform.

The gases discharged from the receivers 33 include principally hydrogen and some unconverted methyl chloride. Where a high rate of flow of the gas mixture through the reaction furnaces is maintained, the methyl chloride content may be considerable, and is usually more than that of the uncondensed gases discharged from an operation of the type described in connection with Fig. 1. These gases may be recirculated through the system through connections 42 and 43 for further conversion of the contained methyl chloride. As the concentration of inert gases in the recirculated gas mixture increases, a part of the uncondensable gases escaping from the receivers 33 may be discharged through connection 44, and subjected to separate treatment for the recovery of any methyl chloride they may contain.

The hydrated lime used in the process may be either finely pulverized or granular in structure. A finely pulverized hydrated lime may be made, for example, by slaking burnt lime with steam. The pulverulent hydrated lime can be converted to a granular product by adding enough water to form a stiff paste, drying the paste and breaking the dried paste up into pieces of the desired size.

The reaction furnaces illustrated in Figs. 3 and 4 are of somewhat similar construction. Each comprises a closed cylinder 50 adapted to withtand the gas pressure employed surrounded by an electrical resistance element 51 for heating the furnace. The cylinder 50 may be made of steel and the resistance element may comprise a ribbon of suitable material, such as nichrome, wound on a layer of sheet asbestos 52 covering the cylinder. The resistance element may be covered and insulated with a layer of insulating material, such as alundum cement. Around the resistance and within the insulating jacket 53, of suitable material such as magnesia, is arranged the pipe coil 54 for preheating the gas mixture discharged into the furnace through the gas inlet connection. A gas outlet connection 60 is provided at the upper end of the cylinder. The furnace temperature may be controlled by regulating the current flowing in the resistance element.

The furnace illustrated in Fig. 3 is adapted to employ either pulverulent or granular hydrated lime. A removable cover 55 adapted to be clamped in place and made gas-tight is provided at the upper end of the cylinder. The hydrated lime is inserted into the furnace in an inner cylinder or cartridge 56. This cartridge is provided at its lower end with an opening 57 adapted to fit snugly over the conical nipple 58 provided on the inner end of the gas inlet 59. To facilitate discharge of the mixture of calcium chloride and unused lime, which frequently tends to cake together into a more or less solid mass, the cartridge is made up of two half cylinders hinged along one longitudinal edge so that it may be opened and the reaction mass readily discharged. The inner cylinder or cartridge can be constructed of light material since it is not required to withstand any pressure either internally or externally. A number of these cartridges may be provided for each of the furnaces employed and the quick charge and discharge of the furnace facilitated whereby loss of heat through lowering of the temperature of the furnace walls may be avoided.

The furnace illustrated in Fig. 4 is adapted to use granular hydrated lime. A covered opening 61 is arranged at the upper end of the cylinder for the introduction of fresh lime and the lower end of the cylinder is provided with a pivoted cover 62 for discharging the contents of the cylinder. The separable gas inlet pipe 63 is arranged to discharge into the lower end of the cylinder through a grating 64 which prevents the escape of the granular charge of lime. An agitator 65 is arranged within the cylinder, driven through the shaft extending through the stuffing box 66 at the upper end of the cylinder, for agitating and mixing the furnace charge.

Agitation of the charge inhibits caking and sintering of the calcium-chloride-lime mixture formed as the reaction proceeds. We have found the extent of the surface of lime exposed to have an important effect upon the rate of reaction and when the effective surface of the lime has been greatly reduced, it may be more advantageous, from the standpoint of time economy, to stop the operation and introduce a fresh charge of lime. By agitation of the lime charge, however, fresh surfaces of lime are constantly exposed and a high reaction rate may be attained while a more complete consumption of the lime may be effected.

It will thus be seen that the present invention provides improved methods and apparatus for carrying out the conversion of methyl chloride to methyl alcohol with steam and lime in a continuous or semi-continuous manner, and it will be further evident that this invention also provides several improvements in the general method of hydrolysis and in furnaces for carrying out the reaction.

The mixture of lime and calcium chloride formed as the reaction progresses may tend to cake and sinter into a solid mass more or less impervious to the gas mixture at the high temperatures employed in the hydrolysis. The rate of reaction appears to be proportional to the surface of lime exposed and such sintering or caking may retard the reaction as well as prevent effective consumption of the lime. By agitating the lime, and the calcium chloride admixed therewith, as the reaction progresses, caking or sintering of the calcium-chloridelime mass is substantially prevented or materially reduced and fresh surfaces are continually exposed to the gas mixture passing through the reaction chamber.

In carrying out the hydrolysis in a continuous or semi-continuous way by effecting the reaction in a plurality of reaction chambers and successively recharging the reaction chambers with fresh lime, a material amount of time during which the hydrolysis might otherwise be taking place may be lost in heating up the fresh charges. By preheating the lime to a temperature not lower than that of the reaction chamber, the hydrolysis may be carried out without interruption longer than that actually required to insert the fresh charge of lime. By preheating the lime, a material time economy may be effected in saving the time otherwise employed in heating a cold charge to the reaction temperature.

The mixture of methyl chloride and steam, as well as the lime, must be heated to the reaction temperature before the hydrolysis can begin, and where the mixture is introduced into the reaction chamber at a temperature lower than that of the reaction, the first part of the reaction chamber is employed for heating the gas mixture rather than for the hydrolysis. By preheating the gas mixture to the reaction temperature, the reaction begins upon introduction of the gas mixture into the reaction chamber and the maximum period of contact under reacting conditions is obtained. By arranging the preheater for the gas mixture and the reaction chamber within the same insulating jacket, the gas mixture may be heated to temperature of the reaction chamber before introduction without involving additional control.

While we have described our invention more particularly in connection with the production of methyl alcohol from methyl chloride, and with the use of lime as the alkaline substance for the conversion, yet it will be understood that other alcohols may be produced from the corresponding alkyl chlorides other than methyl chloride in a similar way and that other alkalies, either alone or in admixture, can also be used.

We claim:

1. The method of producing alcohols which comprises passing an alkyl chloride over an alkaline substance in the presence of superheated steam and replacing the alkaline substance at intervals with preheated material.

2. The method of producing methyl alcohols which comprises passing methyl chloride over lime in the presence of superheated steam and replacing the lime at intervals with preheated fresh lime.

3. The method of producing alcohols which comprises passing over an alkyl chloride an alkaline substance in the presence of superheated steam in a reaction chamber, and discharging the alkaline substance and introducing a fresh charge preheated to a temperature not less than that of the reaction chamber from time to time.

4. The method of producing alcohols which comprises passing an alkyl chloride over an alkaline substance in the presence of superheated steam and agitating the alkaline substance during the progress of the reaction.

5. The method of producing methyl alcohol which comprises passing methyl chloride over lime in the presence of superheated steam and agitating the lime during the progress of the reaction.

6. The method of producing alcohols which comprises passing a mixture including an alkyl chloride and steam over an alkaline substance, and removing the alcohol as it is formed and introducing fresh steam as the reaction progresses.

In testimony whereof we affix our signatures.

ROBERT B. MacMULLIN.
RALPH E. GEGENHEIMER.